(12) United States Patent
Trifonov

(10) Patent No.: US 7,859,744 B2
(45) Date of Patent: Dec. 28, 2010

(54) TUNABLE COMPACT ENTANGLED-PHOTON SOURCE AND QKD SYSTEM USING SAME

(75) Inventor: Alexel Trifonov, Boston, MA (US)

(73) Assignee: MagiQ Technologies, Inc., Somerville, MA (US)

( * ) Notice: Subject to any disclaimer, the term of this patent is extended or adjusted under 35 U.S.C. 154(b) by 822 days.

(21) Appl. No.: 11/881,550

(22) Filed: Jul. 27, 2007

(65) Prior Publication Data

US 2009/0028340 A1    Jan. 29, 2009

(51) Int. Cl.
*G02F 2/02* (2006.01)
*G02F 1/35* (2006.01)
*H04L 9/08* (2006.01)
*G02B 6/34* (2006.01)

(52) U.S. Cl. ........................ 359/332; 359/328; 359/330; 372/22; 372/102; 372/105; 385/37

(58) Field of Classification Search ......... 359/326–332; 372/22, 102, 105; 385/37; 380/44, 46, 278
See application file for complete search history.

(56) References Cited

U.S. PATENT DOCUMENTS

| 6,356,674 | B1 * | 3/2002 | Davis et al. ................... 385/10 |
| 7,142,572 | B2 | 11/2006 | Tojo |
| 7,386,021 | B2 * | 6/2008 | Kashyap ...................... 372/34 |
| 7,791,790 | B2 * | 9/2010 | Furuya et al. ............... 359/328 |
| 2003/0179787 | A1 | 9/2003 | Woodley |
| 2006/0274401 | A1 | 12/2006 | Inoue |

* cited by examiner

*Primary Examiner*—Daniel Petkovsek
(74) *Attorney, Agent, or Firm*—Opticus IP Law, PLLC

(57) ABSTRACT

A robust, quickly tunable narrow-linewidth entangled photon source system based on Spontaneous Parametric Down Conversion (SPDC) of the pump light in periodically polled $LiNbO_3$ (PPLN) waveguides. The photon source provides narrow-linewidth, entangled output photons having a wavelength in the telecom C-Band wavelength. To tailor the output spectrum of the output photons, the PPLN waveguide is arranged between two end waveguides having LiNbO3-embedded Bragg gratings, thereby forming a tunable Fabry-Perot cavity. The resulting narrow output linewidth of the output photons makes the system desirable for use in a long-distance quantum key distribution (QKD) system.

7 Claims, 3 Drawing Sheets

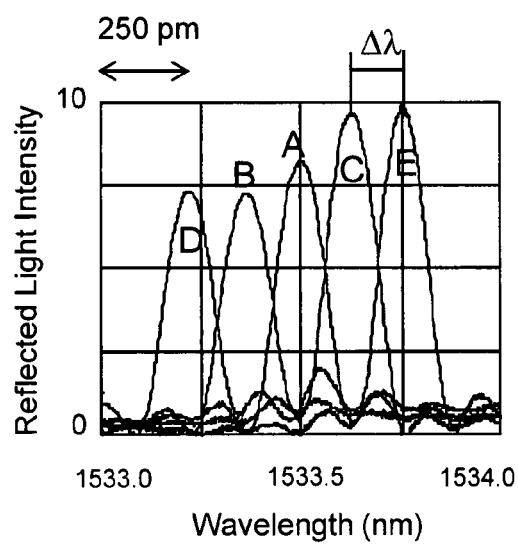 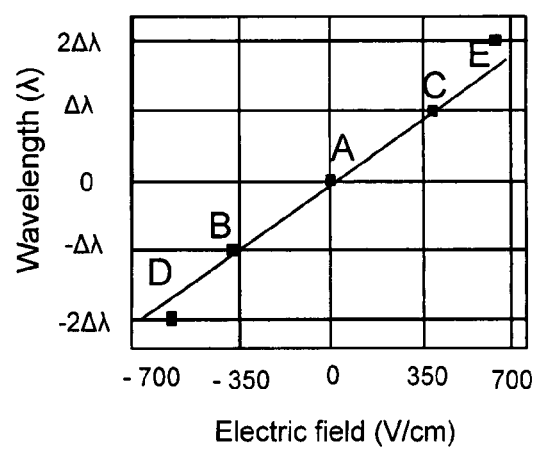
FIG. 2  FIG. 3

TUNABLE COMPACT ENTANGLED-PHOTON SOURCE AND QKD SYSTEM USING SAME

FIELD OF THE INVENTION

The present invention relates generally to sources of single photons, and particularly to tunable, compact single-photon sources and quantum key distribution (QKD) systems using same.

BACKGROUND OF THE INVENTION

QKD involves establishing a key between a sender ("Alice") and a receiver ("Bob") by using either single-photons or weak (e.g., 0.1 photon on average) optical signals (pulses) called "qubits" or "quantum signals" transmitted over a "quantum channel." Unlike classical cryptography whose security depends on computational impracticality, the security of quantum cryptography is based on the quantum mechanical principle that any measurement of a quantum system in an unknown state will modify its state. As a consequence, an eavesdropper ("Eve") that attempts to intercept or otherwise measure the exchanged qubits introduced errors that reveal her presence.

The general principles of quantum cryptography were first set forth by Bennett and Brassard in their article "Quantum Cryptography: Public key distribution and coin tossing," Proceedings of the International Conference on Computers, Systems and Signal Processing, Bangalore, India, 1984, pp. 175-179 (IEEE, New York, 1984). Specific QKD systems are described in U.S. Pat. No. 5,307,410 to Bennett ("the Bennett Patent"), which patent is incorporated by reference herein, and in the article by C. H. Bennett entitled "Quantum Cryptography Using Any Two Non-Orthogonal States", Phys. Rev. Lett. 68 3121 (1992), which article is incorporated herein by reference. The general process for performing QKD is described in the book by Bouwmeester et al., "The Physics of Quantum Information," Springer-Verlag 2001, in Section 2.3, pages 27-33.

Entanglement-based Quantum Communication (QC) and, in particular, QKD, is one of the most promising applications of Quantum Information Science (QIS). A number of technical challenges, however, must be overcome before QKD becomes commercially practical. One of these challenges includes developing high-photon-flux entanglement sources for telecommunication wavelengths (e.g., 1550 nm). Because of the low attenuation of 1550-nm photons in optical fibers, they are natural information carriers for long-distance communication links.

Because quantum communication is based on single photon exchange and detection, it is very important to minimize the number of "unintended" photons—that is to say, the photons that do not participate in the information exchange. Therefore, deploying QKD system in an existing optical fiber communication infrastructure populated by classical communication channels requires very aggressive spectral filtering to minimize the background noise and optimize the signal-to-noise ratio (SNR) at the receiver.

For optimal quantum communication system performance, the width and the shape of the receiver bandpass filter must match the transmitted signal. Narrowing the transmitter spectrum decreases the receiver spectral bandwidth. Since the received noise is proportional to receiver spectral bandwidth, using narrow-line transmitters results in higher SNR, which extends the quantum channel distance budget.

Spontaneous parametric processes naturally produce relatively broadband emission spectra, typically on the order of a few nm to few tens of nm. A broad signal spectrum can cause the signals to spread due to dispersion in fiber-optics-based QKD system. Hence, additional filtering is required. One way to perform such filtering is to use an external bandpass filter at the transmitter output. Unfortunately, this decreases the photon flux and overall link efficiency, which reduces the performance of the quantum communication system.

SUMMARY OF THE INVENTION

One aspect of the invention is a robust, quickly tunable narrow-linewidth entangled photon source system based on Spontaneous Parametric Down Conversion (SPDC) of the pump light in periodically polled LiNbO3 (PPLN) waveguides. In an example embodiment, the photon source system is operated in a synchronous (i.e.—pulsed) regime at the telecom C-Band wavelength (1529 to 1563 nm). In order to tailor the output spectrum, the PPLN waveguide is arranged between two end waveguides having LiNbO3-embedded Bragg gratings, thereby forming a tunable Fabry-Perot cavity. The resulting narrow output linewidth of the entangled photons makes the system desirable for use in a long-distance Quantum Key Distribution (QKD) system. The system is also desirable for use in entanglement-based QKD systems in hybrid optical networks where quantum channels are wavelength-multiplexed with classical (i.e., non-single-photon) channels. By varying the applied electric field in the end waveguides, the spectrum of single/entangled photons can be rapidly tuned, making the system appropriate for use in QKD systems and reconfigurable QKD networks.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and constitute a part of this specification. The drawings illustrate various embodiments of the invention, and together with the description serve to explain the principles and operations of the invention.

BRIEF DESCRIPTION OF THE DRAWINGS

FIG. 2 is a plot of the reflected light intensity (arbitrary units) vs. wavelength (nm) for the Fabry-Perot cavity formed by the three waveguides of the photon source system of FIG. 1;

FIG. 3 is a plot of the wavelength ($\lambda$) vs. the applied electric field (V/cm) for the electrodes in the end waveguides, illustrating the shift in cavity resonant wavelength by changing the media refractive index via an electro-optic effect.

DETAILED DESCRIPTION OF THE PREFERRED EMBODIMENTS

Figure 1:
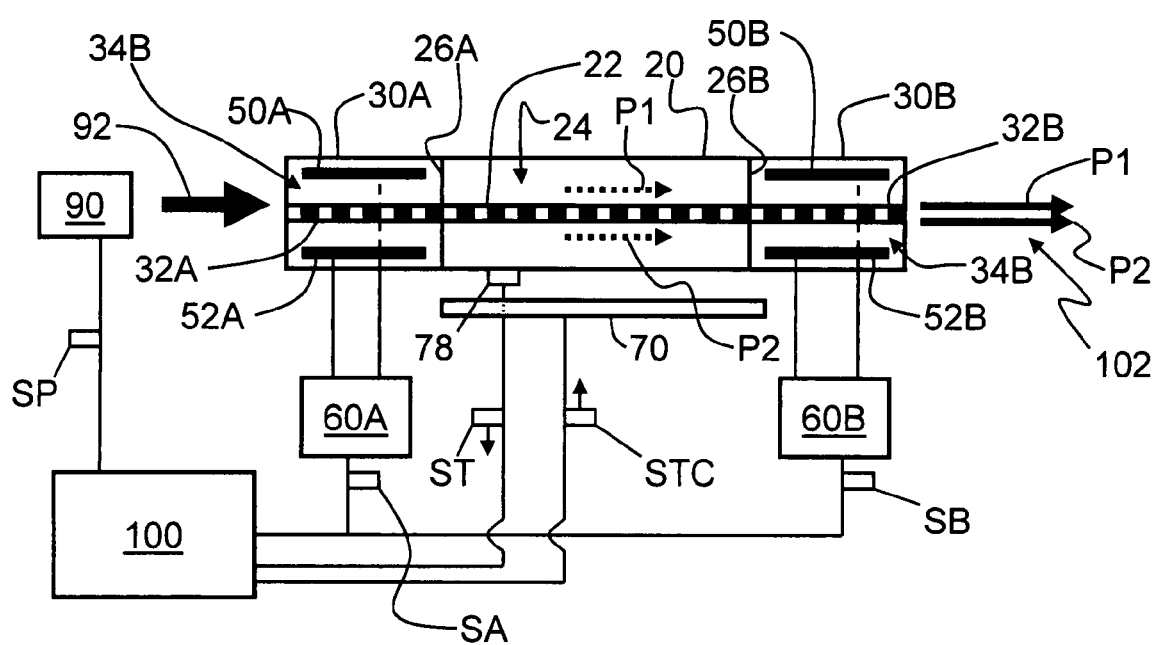
FIG. 1 is a schematic diagram of the photon source system of the present invention.

The present invention includes a tunable narrow-linewidth entangled photon source system (hereinafter, simply "photon source system" or "system") based on Spontaneous Parametric Down Conversion (SPDC) of the pump light in periodically polled lithium niobate (or LiNbO$_3$) (PPLN) waveguides. FIG. 1 is a schematic diagram of an example embodiment of a photon source system 10 in the form of a composite waveguide. Photon source 10 includes an entanglement-generating PPLN waveguide 20 that includes a guiding layer 22 having formed therein a Bragg grating 24. Waveguide 20 has opposite ends 26A and 26B.

It is noted here that that in recent years, PPLN waveguides have become commercially available at reasonable prices from a number of vendors (e.g., HC Photonics, Inc., and Thorlabs, Inc.).

System 10 also includes two end waveguides 30A and 30B in the form of tunable Bragg filters/reflectors arranged at respective ends 26A and 26B of waveguide 20, so that waveguide 20 is sandwiched therebetween. Waveguides 30A and 30B each include respective waveguide layers 32A and 32B and respective Bragg gratings 34A and 34B formed therein. Waveguides 30A and 30B each also includes electrode pairs 50A, 52A and 50B, 52B arranged on respective sides of waveguide layers 32A and 32B so that the waveguide layers can be subjected to an electric field, as explained below. For the end waveguides 30A and 30B, suitable waveguides are LiNbO3-embedded tunable Bragg gratings such as those recently been developed by SWET Optics, GmbH of Germany. Waveguide 20, in combination with the surrounding end waveguides 30A and 30B, form a Fabry-Perot cavity having an adjustable cavity resonant wavelength.

Electrodes 50A and 52A are electrically coupled to a voltage source 60A, while electrodes 50B and 52B are electrically coupled to a voltage source 60B.

In an example embodiment, system 10 also includes a temperature control element 70 in thermal communication with waveguide 20 to control the temperature of the waveguide. A temperature sensor 78 is also provided to measure the temperature of waveguide 20 and provide a temperature signals ST.

System 10 also includes a pump light source 90 adapted to emit pump light 92, e.g., at a wavelength of 775 nm.

System 10 further includes a controller 100 electrically coupled to pump light source 90, voltage sources 60A and 60B, temperature control element 70, and temperature sensor 78. In an example embodiment, controller 100 is a microprocessor, or a computer that includes a microprocessor, wherein the controller is programmed with instructions to carry out the method of operation of the system as described below. In an example embodiment, the microprocessor is or includes a field-programmable gate array (FPGA). The instructions in controller 100 can be implemented either in hardware or software (e.g., an FPGA or central processing unit (CPU)), and can exist in a variety of forms both active and inactive. For example, they can exist as one or more software programs comprised of program instructions in source code, object code, executable code or other formats. Any of the above formats can be embodied on a computer-readable medium, which include storage devices and signals, in compressed or uncompressed form. Exemplary computer-readable storage devices include conventional computer system RAM (random access memory), ROM (read only memory), EPROM (erasable, programmable ROM), EEPROM (electrically erasable, programmable ROM), flash memory and magnetic, optical disks or tapes.

Method of Operation

With continuing reference to FIG. 1, in the operation of photon source system 10, controller 100 sends a pump signal SP to pump light source 90, which in response thereto generates pump light 92 at a desired wavelength. In an example embodiment, pump light source 90—and thus photon source system 100—operates in synchronous (i.e.—pulsed) regime, preferably at an output wavelength in the telecommunication C-Band, namely, between 1529 nm and 1563 nm.

In an example embodiment, the wavelength of pump light 92 is 775 nm. In a more general example embodiment, the pump light has a wavelength that is half that of one of a desired telecommunication wavelengths, such as those mentioned above. Pump light 92 serves to generate entangled photons P1 and P2 (dashed arrows) within guiding layer 22 of waveguide 20 via a SPDC process. Photons P1 and P2 are outputted from end waveguide 30B as output light (output photons) 102.

Controller 100 also receives temperature signal ST from temperature sensor 78 and in response thereto controls the temperature of waveguide 20 via temperature control element 70 and a temperature control signal STC provided thereto.

Meanwhile, controller 100 sends voltage control signals SA and SB to voltage controllers 60A and 60B. In response thereto, voltage controllers 60A and 60B provide voltage signals SVA and SVB (not shown) to their corresponding electrodes 50A, 52A and 50B, 52B so as to create first and second electrical potentials between the two sets of electrodes, which in turn generates respective electric fields within waveguide layers 32A and 32B. The electrical fields serve to change the media index of refraction and shift the cavity resonant wavelength of the Fabry-Perot cavity formed by waveguides 30A, 20 and 30B. Thus, system 10 exploits the change of the grating transfer function via applied electric fields in waveguides 30A and 30B to tune the resonant cavity wavelength and, correspondingly, the output spectrum of the entangled output photons P1 and P2.

Entangled output photons P1 and P2 have a relatively narrow-line output spectrum as compared to entangled photons typically generated through SPDC mechanisms. According to Bragg's law, the grating reflection peaks when the light wavelength ($\lambda$), grating period ($\Lambda$), and the material refractive index (n) satisfy the condition $\lambda_B = 2\Lambda n$, where $\lambda_B$ is the Bragg wavelength. The reflected spectrum bandwidth $\delta\lambda = \lambda_B - \lambda_0$ is defined by the length of the grating (T) and its period: ($\delta\lambda/\lambda_B$)=($\Lambda/T$). Thus, the grating acts as an optical bandpass filter, or a mirror with a wavelength-dependent reflectivity. The dependence of the reflected light intensity on the wavelength is often referred to as the "transfer function" of the grating. The present invention exploits the ability to change the transfer function using an applied electric field in the end waveguides 30A and 30B to provide a narrowly tuned output spectrum for the outputted entangled photons P1 and P2.

When the Bragg grating is embedded in an electro-optical material such as LiNbO$_3$, the average refractive index of the media depends on the applied electric field (E). In this case, the Bragg-selected wavelength can be adjusted by changing the material refractive index with the external electric field. FIGS. 2 and 3 illustrate the Bragg wavelength dependence on the applied electric field.

To the best of the inventor's knowledge, all other commercially available tunable Bragg gratings use thermo-mechanical material expansion to change the grating period and, consequently, the Bragg wavelength. However, the LiNBO$_3$ gratings employed in the present invention are simple and have no moving parts. This allows for photon source system 10 to be tuned much quicker than prior art systems, i.e., faster than 1 nm/s, which is orders of magnitude quicker than prior art systems.

The resulting narrow-output linewidth of entangled photons P1 and P2 makes system 10 a good light source for performing long-distance QKD. It is also useful for entanglement-based QKD deployment in hybrid optical networks where quantum channels are wavelength multiplexed with classical (i.e., non-single-photon) channels. By varying the applied electric field in end waveguides 30A and 30B, the spectrum of the output photons can be rapidly tuned, which is a useful property for reconfigurable QKD networks. Note that for QKD applications, one or both of the outputted photons P1 and P2 and be used.

QKD System with Photon Source System

Figure 4:
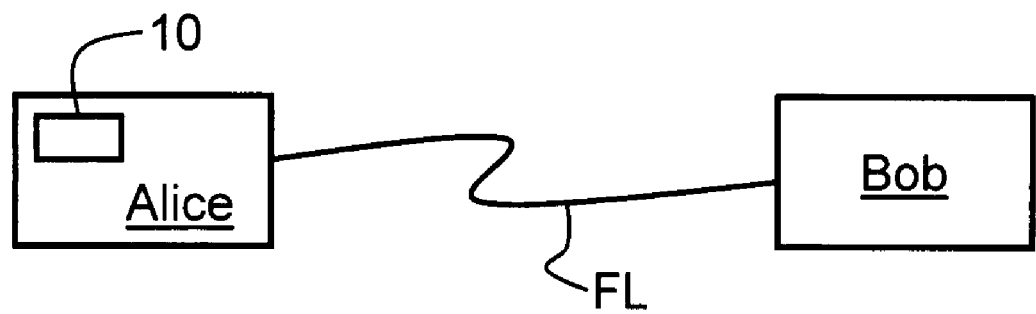
FIG. 4 is a schematic diagram of a QKD system that utilizes the photon source system of FIG. 1.

FIG. 4 is a schematic diagram of a QKD system 200 that includes a first QKD station Alice and a second QKD station Bob optically coupled via an optical fiber link FL. Alice includes photon source system 10 as described above. QKD system 200 is, for example, as described in the above-mentioned Bennett Patent, or in U.S. Pat. No. 7,102,121 to LaGasse, which patent is also incorporated by reference herein.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A photon source system, comprising:
    a periodically polled lithium niobate (PPLN) waveguide having first and second ends and adapted to perform spontaneous parametric downconversion (SPDC) of pump light having a first wavelength;
    first and second end waveguides having lithium-niobate-embedded Bragg gratings, the first and second end waveguides being respectively arranged at the first and second ends of the PPLN waveguide so as to form a Fabry-Perot cavity having a cavity resonant wavelength, wherein the first and second end waveguides each include electrodes adapted to provide an adjustable applied electric field so as to adjust said cavity resonant wavelength; and
    a pump light source optically coupled to the first end waveguide and adapted to provide said first-wavelength pump light therethrough to the PPLN waveguide so that the PPLN waveguide can convert the pump light via SPDC to generate output photons having a second wavelength that is twice the first wavelength and having an output spectrum that corresponds to the applied electric field in the first and second end waveguides.

2. The system of claim 1, including first and second voltage sources operably coupled to the electrodes in the first and second end waveguides.

3. The system of claim 1, including a temperature control element arranged to control the temperature of the PPLN waveguide.

4. The system of claim 3, including a temperature sensor arranged to measure the temperature of the PPLN waveguide and provide a temperature signal for controlling the PPLN waveguide temperature.

5. The system of claim 1, wherein the output photons have a wavelength in the telecommunication C-band.

6. The system of claim 1, wherein the system generates output photons in a synchronous mode.

7. A quantum key distribution (QKD) system, comprising:
    a first QKD station having the photon source system of claim 1; and
    a second QKD station optically coupled to the first QKD station.

* * * * *